United States Patent
Matsutsuka et al.

(10) Patent No.: US 6,211,872 B1
(45) Date of Patent: Apr. 3, 2001

(54) APPARATUS FOR CONSTRUCTING AND OPERATING INTERACTIVE SOFTWARE

(75) Inventors: Takahide Matsutsuka; Kenji Nagahashi; Hirotaka Hara; Sanya Uehara, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/174,592

(22) Filed: Oct. 19, 1998

(30) Foreign Application Priority Data

Mar. 31, 1998 (JP) .................................................. 10-086099

(51) Int. Cl.[7] ....................................................... G06F 3/14
(52) U.S. Cl. .......................... 345/339; 345/333; 345/335; 345/334; 345/326; 709/302
(58) Field of Search .................................... 345/335, 333, 345/334, 339, 326; 709/302

(56) References Cited

U.S. PATENT DOCUMENTS

| 4,727,575 | * | 2/1988 | Hansen et al. | 379/93.14 |
|---|---|---|---|---|
| 4,866,638 | * | 9/1989 | Cosentino et al. | 395/335 |
| 4,905,181 | * | 2/1990 | Gregory | 709/100 |
| 5,321,837 | * | 6/1994 | Daniel et al. | 707/4 |
| 5,341,293 | * | 8/1994 | Vertelney et al. | 707/530 |
| 5,509,116 | * | 4/1996 | Hiraga et al. | 707/1 |
| 5,559,802 | * | 9/1996 | Robinson et al. | 370/469 |
| 5,604,863 | * | 2/1997 | Allen et al. | 714/11 |
| 5,604,907 | * | 2/1997 | Conner et al. | 709/303 |
| 5,680,617 | * | 10/1997 | Gough et al. | 707/104 |
| 5,793,362 | * | 8/1998 | Matthews et al. | 709/224 |

FOREIGN PATENT DOCUMENTS 8-190476   7/1996 (JP) .

* cited by examiner

Primary Examiner—Raymond J. Bayerl
Assistant Examiner—Thomas T. Nguyen
(74) Attorney, Agent, or Firm—Staas & Halsey LLP

(57) ABSTRACT

A state transition definition table describes state transition definitions. A state transition table generation class is generated from the state transition definition table. A state transition management module controls the state transition of screens utilizing a state transition table generated from a state transition table generation class, based on the input of events derived from screens. A state transition management module controls the display of screens based on the state transition thereof.

12 Claims, 13 Drawing Sheets

| STATE NAME | SCREEN NAME | EVENT | EXECUTE ROUTINE | TRANSITION DESTINATION |
|---|---|---|---|---|
| ORDER RECEIPT PROCESS | chemical1.OrderHandler | | | |
| INITIAL STATE | | INITIALIZATION | INITIAL STATE, INITIALIZATION | SALES TRANSACTION TERMS SEARCH |
| SALES TRANSACTION TERMS SEARCH | chemical1.MAX000F | INITIALIZATION | SALES TRANSACTION TERMS SEARCH, INITIALIZATION | |
| | | EXECUTE | SALES TRANSACTION TERMS SEARCH, EXECUTE | SALES TRANSACTION TERMS SELECTION |
| | | COMPLETION | SALES TRANSACTION TERMS SEARCH, COMPLETION | MENU, INITIALIZATION |
| | | CLIENT (CUSTOMER) SEARCH | SALES TRANSACTION TERMS, CLIENT (CUSTOMER) SEARCH | |
| | | DEMANDANT SEARCH | SALES TRANSACTION TERMS SEARCH, REQUEST SEARCH | |
| | | ORDER RECEIPT DEPARTMENT NUMBER CHECK | SALES TRANSACTION TERMS SEARCH, ORDER RECEIPT DEPARTMENT NUMBER CHECK | |
| | | INPUT SUPERVISOR NAME CODE CHECK | SALES TRANSACTION TERMS SEARCH, INPUT SUPERVISOR NAME CHECK | |
| SALES TRANSACTION TERMS SELECTION | chemical1.MAX010F | INITIALIZATION | SALES TRANSACTION TERMS SELECTION, INITIALIZATION | |
| | | EXECUTE | SALES TRANSACTION TERMS SELECTION, EXECUTE | DELIVERY DESTINATION INPUT |
| | | CANCEL | SALES TRANSACTION TERMS SELECTION, CANCEL | SALES TRANSACTION TERMS SEARCH |
| DELIVERY DESTINATION INPUT | chemical1.MAX020F | INITIALIZATION | DELIVERY DESTINATION, INITIALIZATION | |
| | | EXECUTE | DELIVERY DESTINATION INPUT, EXECUTE | LOT ALLOCATION |
| | | CANCEL | DELIVERY DESTINATION INPUT, CANCEL | SALES TRANSACTION TERMS SELECTION |
| LOT ALLOCATION | chemical1.MAX030F | INITIALIZATION | LOT ALLOCATION, INITIALIZATION | |
| | | EXECUTION | LOT ALLOCATION, EXECUTE | ORDER RECEIPT CONFIRMATION |
| | | CANCEL | LOT ALLOCATION, CANCEL | DELIVERY DESTINATION INPUT |
| ORDER RECEIPT CONFIRMATION | chemical1.MAX040F | INITIALIZATION | ORDER RECEIPT CONFIRMATION, INITIALIZATION | |
| | | EXECUTE | ORDER RECEIPT CONFIRMATION, EXECUTE | INITIALIZATION |
| | | CANCEL | ORDER RECEIPT CONFIRMATION, CANCEL | LOT ALLOCATION |

| SCREEN NAME | SCREEN ITEM NAME | DISPLAY NAME 1 | DISPLAY NAME 2 | NUMBER OF PLACES | INPUT | REQUISITE | CHARACTER TYPE |
|---|---|---|---|---|---|---|---|
| MAX000F | ORDER DIVISION CODE | ORDER DIVISION CODE | Order Div. Code | 10 | YES | REQUISITE | NUMERIC |
| | ORDER DIVISION NAME | ORDER DIVISION NAME | Order Div. Name | 20 | YES | | ALPHA-NUMERIC |
| | INPUT SUPERVISOR CODE | INPUT SUPERVISOR CODE | Person Code | 8 | YES | REQUISITE | NUMERIC |
| | INPUT SUPERVISOR NAME | INPUT SUPERVISOR NAME | Person Name | 20 | YES | | ALPHA-NUMERIC |
| | CUSTOMER | CUSTOMER | Customer | 40 | YES | REQUISITE | JAPANESE |
| | DEMANDANT | DEMANDANT | Request | 40 | YES | | JAPANESE |
| | ITEM | ITEM | Item | 40 | YES | REQUISITE | JAPANESE |
| MAX010F | ORDER DIVISION CODE | ORDER DIVISION CODE | Order Div. Code | 10 | NO | | NUMERIC |
| | ORDER DIVISION NAME | ORDER DIVISION NAME | Order Div. Name | 20 | NO | | ALPHA-NUMERIC |
| | INPUT SUPERVISOR NAME CODE | INPUT SUPERVISOR NAME CODE | Person Code | 8 | NO | | NUMERIC |
| | INPUT SUPERVISOR NAME | INPUT SUPERVISOR NAME | Person Name | 20 | NO | | ALPHA-NUMERIC |
| | CUSTOMER | CUSTOMER | Customer | 40 | NO | | JAPANESE |
| | ITEM | ITEM | Item | 40 | NO | | JAPANESE |
| | TRANSACTION TERMS SEARCH RESULT | TRANSACTION TERMS SEARCH RESULT | Search Result | | YES | | |

A USER INPUTS PORTIONS ENCLOSED BY THE BROKEN LINES. ALL OTHER PORTIONS ARE GENERATED AUTOMATICALLY

| SCREEN NAME | SCREEN ITEM NAME | I/O | EQUIVALENT (CORRESPONDING) ITEM NAME | CONTINUATION | CHECK FOR PRESENCE | CANDIDATES |
|---|---|---|---|---|---|---|
| MAX000F | ORDER DIVISION CODE | I | ORDER RECEIPT, ORDER DIVISION CODE | | ORGANIZATION, ORGANIZATION CODE | |
| | ORDER DIVISION NAME | I/O | ORDER RECEIPT, ORDER DIVISION NAME | | | |
| | INPUT SUPERVISOR NAME CODE | I | ORDER RECEIPT, SUPERVISOR CODE | | EMPLOYEE, EMPLOYEE CODE | |
| | INPUT SUPERVISOR NAME | O | ORDER RECEIPT, SUPERVISOR NAME | | | |
| | CUSTOMER | I | ORDER RECEIPT, CUSTOMER | | CUSTOMER, CUSTOMER NAME | CUSTOMER, CUSTOMER NAME |
| | REQUEST | I | ORDER RECEIPT, REQUEST | | REQUEST, REQUEST NAME | REQUEST, REQUEST NAME |
| | ITEM | I | ORDER RECEIPT, ITEM | | | |
| MAX010F | ORDER DIVISION CODE | O | | MAX000F.ORDER DIVISION CODE | | |
| | ORDER DIVISION NAME | O | | MAX000F.ORDER DIVISION NAME | | |
| | INPUT SUPERVISOR NAME CODE | O | | MAX000F.INPUT SUPERVISOR NAME CODE | | |
| | INPUT SUPERVISOR NAME | O | | MAX000F.INPUT SUPERVISOR NAME | | |
| | CUSTOMER | O | | MAX000F.CUSTOMER | | |
| | ITEM | O | | MAX000F.ITEM | | |
| | TRANSACTION TERMS SEARCH RESULT | I | ORDER RECEIPT, TRANSACTION TERMS | | | |

A USER INPUTS PORTIONS ENCLOSED BY THE BROKEN LINES. ALL OTHER PORTIONS ARE GENERATED AUTOMATICALLY.

F I G. 11

APPARATUS FOR CONSTRUCTING AND OPERATING INTERACTIVE SOFTWARE

BACKGROUND OF THE INVENTION

1. Field of the Invention

The present invention relates to technology for efficiently developing and processing a plurality of screens and state transitions for business application software that perform, illustratively, fundamental office administration processes.

2. Description of the Related Art

Given their multi-functionality, business software applications that perform basic office administration and like process comprise a plurality of screens and are executed while states thereof undergo complex transitions. Accordingly, a device that efficiently develops and processes a plurality of screens and transition states for business application software is desired.

Application generating frameworks, such as fourth generation language (4GL) and card-type databases that automatically time database and display screen interaction have been available hitherto. Such systems are, however, ill-suited to handling screen transitions inherent in complex condition judgments and attendant data not stored in a database. This is attributable in part to the one-to-one correspondence between screens and database items, as well as the need to create code to control states for each screen.

The related art is plagued further by its inability to respond to so-called three-tier client server systems that have taken into consideration load dispersion.

Furthermore, because screens in the related art are prepared based on database items, independent determination of screen definitions is problematic. In actual development processes there have been many instances in which database items and screen items are simultaneously developed with the aim of enhancing efficiency. However, application of the related art to these types of situations has been difficult.

In card-type databases, on the other hand, database items are determined contemporaneously with screen development. This type of arrangement, too, is questionable, because of its inability to express complex relationships among data that are used, illustratively, in relational databases.

SUMMARY OF THE INVENTION

The present invention is effected against the background recited above and makes possible the efficient development of interactive business applications comprising a plurality of screens. The present invention also makes possible the automated generation of portions of software based on specification documents generated at the time specifications are prepared. Furthermore, the present invention aims to increase the effectiveness of software development and protection, by separating screen display, action execution, and database operating areas.

The present invention presupposes an apparatus for constructing and operating interactive software based on specification definitions.

Additionally, a state transition definition table describes state transition definitions. State transition table generating classes are automatically generated from a state transition definition table. A state transition management module controls screen state transition utilizing the state transition table, which is generated from state transition table generation classes, based upon the input of events originating from a screen. The state transition management module controls screen display based upon state transition.

BRIEF DESCRIPTION OF THE DRAWINGS

Other purposes and features of the present invention are readily comprehensible to one skilled in the art from the attached drawings and the explanation of the preferred embodiments.

FIG. 9 discloses an illustrative state transition definition table.

FIG. 10 shows an illustrative screen item restrictions table.

FIG. 11 shows an illustrative database item equivalency table.

DESCRIPTION OF THE PREFERRED EMBODIMENTS

Explanation of Principle

The principle of the present invention is explained hereunder.

Figure 1:
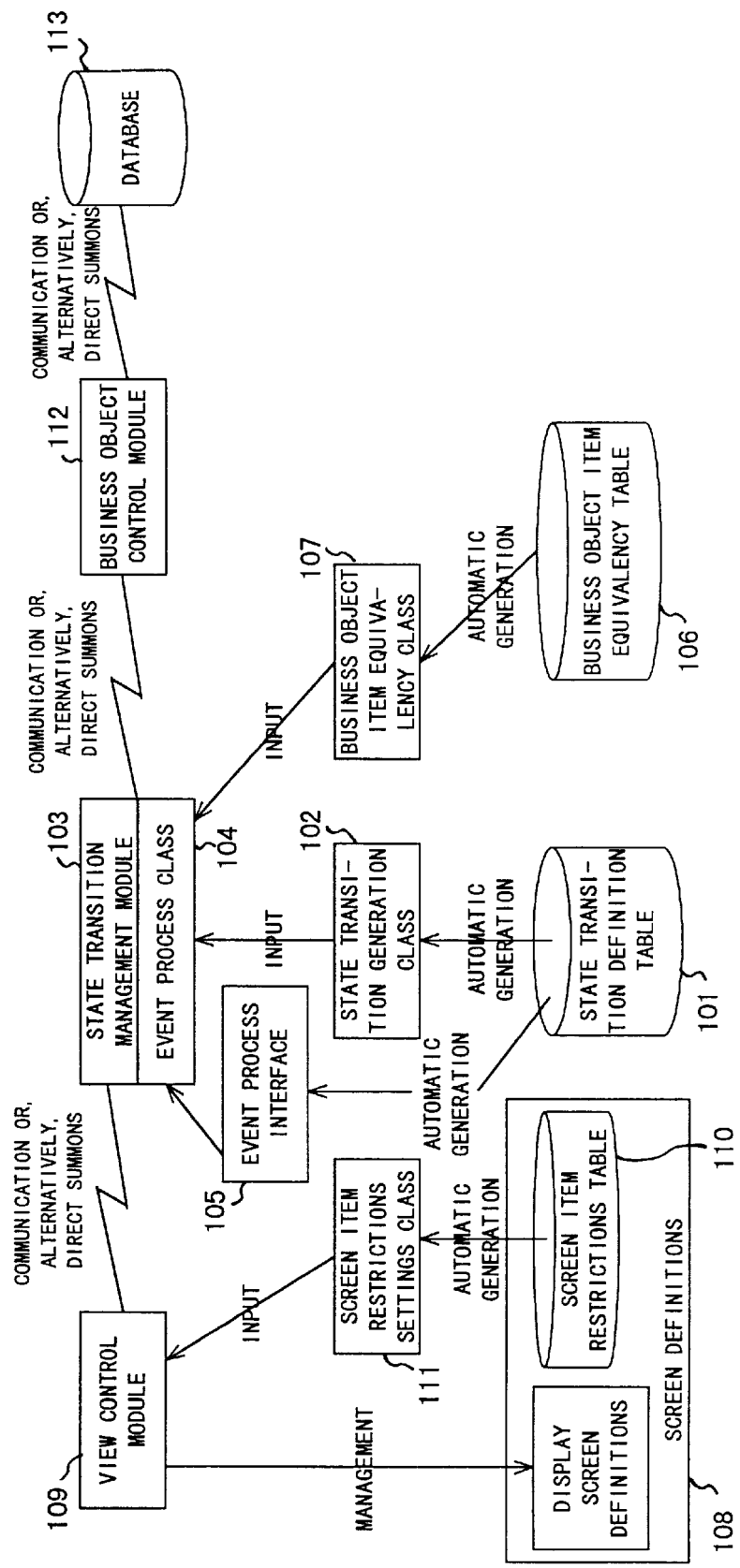
FIG. 1 presents the principle block diagram for the present invention.

FIG. 1 presents the principle block diagram for the present invention.

State transition definition table 101 describes state transition definitions. State transition definition table 101 comprises, by way of illustration, descriptions of state names, an event name for each state name, and an action name for each event name. State transition definition table 101 also includes descriptions of screen names.

State transition table generation class 102 is generated automatically from state transition definition table 101.

State transition management module 103 controls state transition with reference to the state transition table which, based on even inputs, is generated from state transition table generation class 102. State transition management module 103 controls state transition for screens using, illustratively, the state transition table generated from state transition table generation class 102, which is based on event inputs originating from screens. Screen state management is easily realized by controlling the screen display based on the state transition thereof.

By means of the above-described configuration, a developer is able to generate automatically the state transition table generation class, which is executed by the state transition management module, and also able efficiently to process events by merely describing the state transition definition table.

Multiple ("more than one") event process class 104 executes processing of each event corresponding to each action name defined in state transition definition table 101. By referring to the state transition table upon the origination of an event, the state transition management module 103 acquires an action name corresponding to an event name, which corresponds to the instant event and the event name concurring with the present state, and starts an event process class responsive to the action name. State transition management module 103 controls state transition predicated on the execution result in event process class 104.

This configuration facilitates efficient event processing.

Event process interface 105 is automatically generated from state transition definition table 101 and holds event process class 104 interface.

Amendment of the state transition definition table, with reference to the event process interface, makes possible facile coordination of event process classes and state transition definition table.

Business object item equivalency table 106 describes the corresponding relationship between each screen item and each business object item. Because a portion of the business object equivalency table 106 is automatically generated based on screen definitions 108, the description in the business object item equivalency table is simplified.

Business object item equivalency class 107 is automatically generated from business object item equivalency table 106.

Upon the origination of an event, event process class 104 establishes corresponding relationships with each item in the screen wherein the event originated and each item among business objects by executing business object item equivalency class 107.

This configuration makes possible the automatic establishment of equivalency with business object items relating, illustratively to, screen items and data base items, when an event process class is executed.

Business object control module 112 accesses, for example, database 113, according to a demand from event process class 104, and then returns an access result to event process class 104.

The state transition management module 103 controls screen display using logic screen data. View control module 109 converts the logic screen data into physical screen data and, using the physical screen data, controls display in, or input to, the physical screen, The segregation of physical screen data and logic screen data in this configuration renders unnecessary server-side program changes and facilitates customization of screen appearance. Segregation is also responsive, illustratively, to changes in client area platforms that execute screen display. Furthermore, combining physical screen data with other logic screen data facilitates the reuse of physical screens.

Logic screen data comprise demand data, which regulate events originating from screens. State transition management module 103 or, alternatively, event process class 104, can be configured to manage screen information collectively.

This configuration facilitates the collective management of screen information at, illustratively, the server-side.

View control module 109 executes a desired program when an event originates from a screen and is configured to control events transmitted to state transition management module 103, according to execution of the program.

This configuration makes possible efficient network communication.

Screen item restrictions table 110 describes screen item restrictions that control display with respect to each item in the screen or, alternatively, input with respect thereto. A portion of the screen item restrictions table 110 is automatically generated based upon screen definitions 108.

Screen item restrictions settings class 111 is automatically generated from screen item restrictions table 110.

By executing screen item limitations settings class 111, view control module 109 controls display with respect to each item in the screen, or, alternatively, input with respect thereto.

This configurations facilitates the automated checking of screen items through mere description of the screen item restrictions table.

Sets of screen item restrictions corresponding to a plurality of display formats or, alternatively, to a plurality of input formats, are described in screen item restrictions table 110. The screen item restrictions table 110 can be configured so that, as sets of screen item restrictions are alternatingly designated, a plurality of screen formats or, alternatively, input formats, are switched for each screen.

It is thus possible, according to this configuration, to realize easily the switching, for each screen, of a plurality of display formats or, alternatively, a plurality of inputs.

By preserving the parent/child relationship for state transition, the state transition management module 103 can be configured so that it processes in parallel a plurality of states.

This configuration thus makes possible parallel processing of a plurality of states.

Also, state transition management module 103 can be configured so that a parent state transition not appearing in an execution stack is notified of exceptions occurring in a child state transition, by converting exceptions occurring in each state transition to events and sending out the exceptions.

This configuration thus enables efficient processing when an exception occurs.

The state transition management module 103 can also be configured to comprise means for electing whether to input events via a network.

This configuration thus enables facile system responsiveness with respect to network and non-network environments.

Furthermore, the present invention can be configured as a computer readable storage medium that causes a computer to perform functions similar to those realized according to the configurations of the present invention, as set forth above.

DETAILED DESCRIPTION OF THE PREFERRED EMBODIMENT

The preferred embodiment of the present invention is hereinafter explained in detail, with reference to accompanying drawings.

<Distinctive Features of the Preferred Embodiment of the Present Invention>

Figure 2:
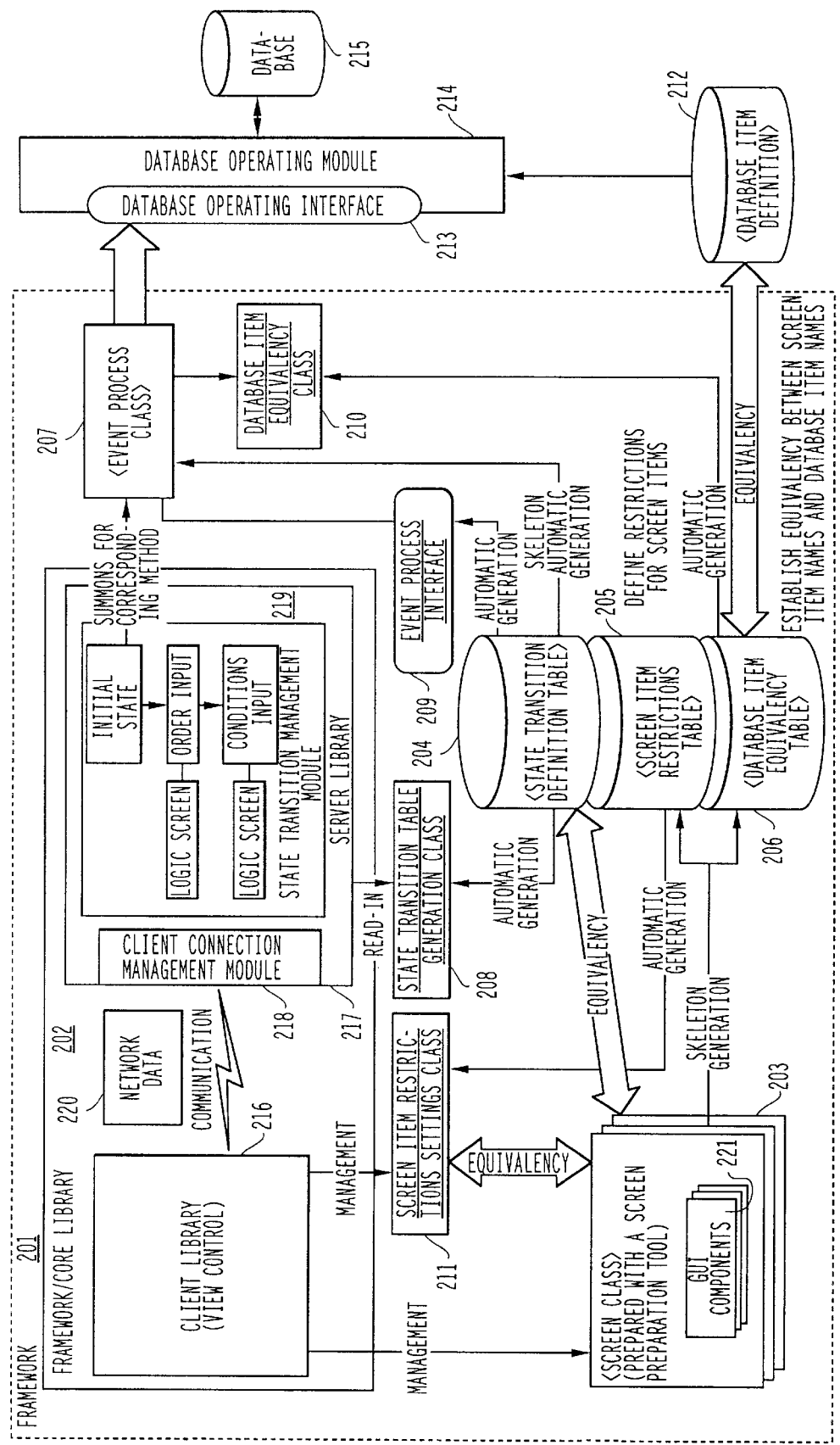
FIG. 2 shows the system configuration for the preferred embodiment of the present invention.

FIG. 2 discloses the system configuration of the preferred embodiment of the present invention and concentrates on the framework 201 achieved according to the present invention. The following distinctive functions are achieved through framework 201.

- Because views are divided and managed in physical screens and logic screens, it is possible separately to develop client areas.
- Information relating to screen state transition is managed in response to events from client areas, and events corresponding to screen information (logic screen) are generated. Events matching screen information are mapped on a logic screen in a client area.

Screen display control is accomplished by means of manipulation with respect to a logic screen.

<Basic Architecture>

Figure 3:
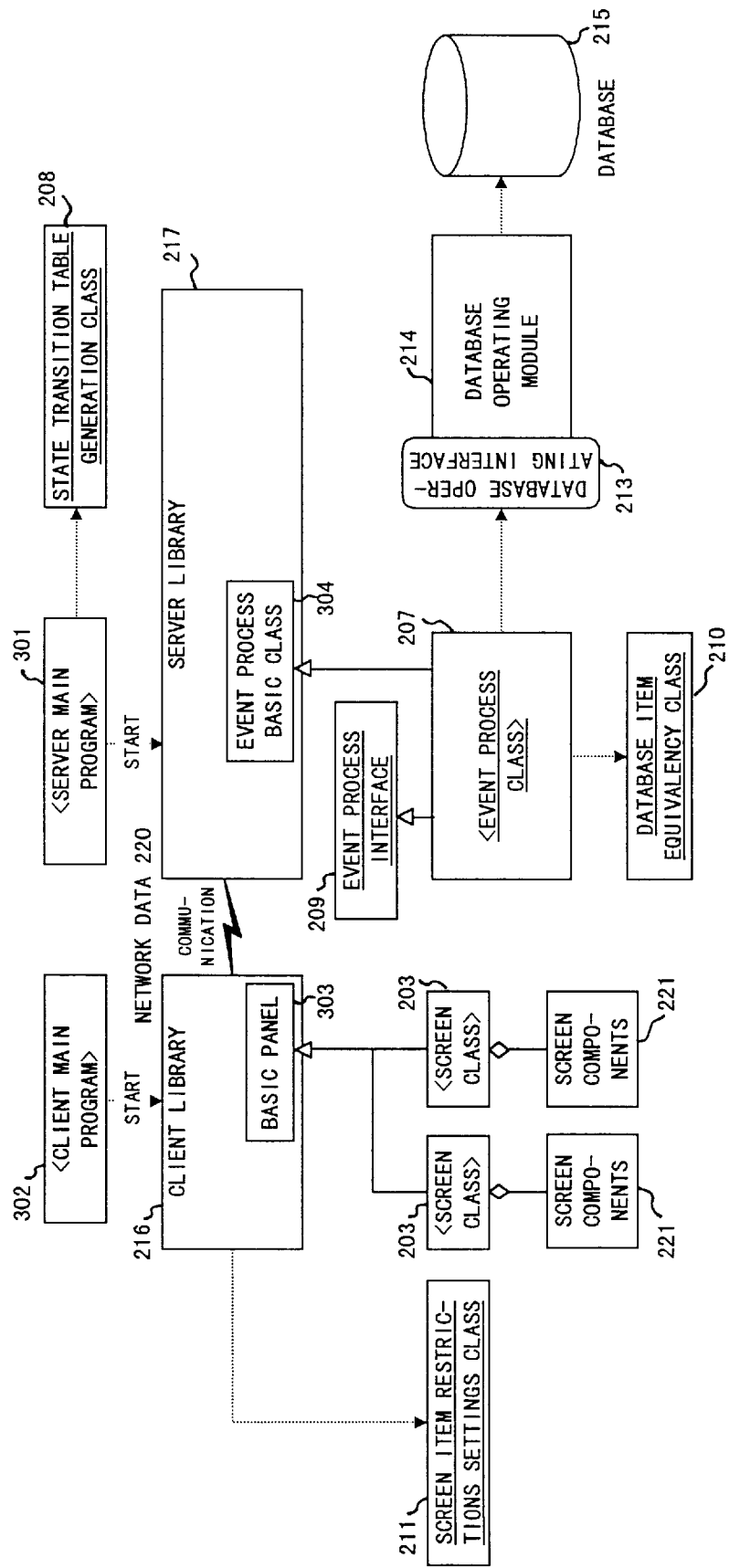
FIG. 3 represents an operating program block diagram for the preferred embodiment of the present invention.

FIG. 3 shows the operating block diagram disclosing the operation of framework 201, shown in FIG. 2.

Although the framework 201 shown in FIG. 2 need not be installed in a client server system, the following explanation presupposes a client server system.

In this case, framework core library 202, the main program component of framework 201, comprises, as disclosed in FIG. 2 and FIG. 3, client library 216 (view controller 216), which operates in a client area, and server library 217, which operates in a server area. Network data are communicated between client library 216 and server library 217.

Titles bracketed by "<" and ">" A in FIG. 2 and FIG. 3 represent user-prepared specification documents, codes, and classes. Titles underlined in FIG. 2 and FIG. 3 represent automatically generated classes or, alternatively, data.

Event process class 207 is partially automatically generated. User supplements specific event processing codes to event process class 207.

When a client area is in operation, view controller 216, comprising client library 216 operating in a client area, uses screen class 203 and screen item restrictions settings class 211.

Operating in a server area, server library 217 comprises client connection management module 218 and state transition management module 219 and, when operating in a server area, uses state transition table generation class 208, event process class 207, and database item equivalency class 210.

<View Controller 216 (Client Area)>

View controller 216, which is client library 216, is a software module operating in a client area and is started from client main program 302. View controller 216 accomplishes the following functions.

Displaying of screens specified by network data 220.

Displaying of values in screen components 221 specified by network data 220.

Forwarding of an event originating from a screen, as a network event comprising part of network data 220, to a server area. At this time, it is possible to transmit content (character strings and so on, described in a text field) established by a screen component 221 together with the network event.

When view controller 216 is started, it connects to client connection management module 218 in a server area. When view controller 216 is operating, however, it is possible to specify whether a network is to be used.

Where a network is used, view controller 216 connects by electronic communication to client connection management module 218 in a server area and performs display based on logic screen data.

Thus, in the preferred embodiment of the present invention, it is possible to develop a server-side system, independently of specific program languages, executed in a client area, and platforms, because control data for screen display are communicated as logic screen data.

Specifically, by substituting view controller 216, it is possible, illustratively, to effect platform changes in a client area.

<Client Connection Management Module 218 (Server Area)>

Constituting server library 217, client connection management module 218 operates in a server area and performs connection management in order to facilitate the connection of a plurality of client areas to a single server area.

Server library 217, which comprises client connection management module 218, is started from server main program 301.

When view controller 216 is newly started in a single client area, client connection management module 218 allocates memory storage areas for view controller 216.

Client connection management module 218 manages present activity states for each view controller 216 and forwards network events received electronically from each view controller 216 to state transition management modules 219 corresponding to particular view controllers 216. Client connection management module 218, on the other hand, transmits to each view controller 216 logic screen data received from state transition management module 219.

<State Transition Management Module 219 (Server Section)>

Constituting server library 217, state transition management module 219 operates in a server area and achieves the following functions.

Converts a network event received from a server area to a suitable event process class 207 method and executes that method.

Causes a state to undergo transition, when required as a result of event processing by event process class 207.

Where a state undergoes transition, produces screen logic data corresponding to the state.

Transmits logic data prepared in event process class 207 or, alternatively, state transition management module 219, as network data 220 to a client area.

Among the state transitions made possible by state transition management module 219 are the following types.

1. State transitions within the same state transition.
2. State skipping to a separate state transition state. In this case, a post-transition state does not return to the original state, even after the separate state transition is completed.
3. Starting of a separate state transition. In this case, the state transition so started becomes a "child" of the original state transition, and the original state transition becomes the "parent" of the different state transition.

<Screen Class 203 (Client Section)>

Screen class 203 is installed in a client area and displays the logic screen, which is managed by view controller 216. Screen class 203 is a class that (displays) screen components 221, which are displayed according to demands from a server area. Each screen component 221 within screen class 203 is identified by a respective name assigned thereto.

View controller 216 specifies the screen components 221 that are to be displayed by linking screen component names, which are logic screen data sent through a network, with the names of screen components 221 in screen class 203, when displaying character strings and so on in the screen item.

Screen class 203 is constructed using basic panel 303, which is installed in view controller 216 (client library 216). Basic panel 303 is a screen component serving as a container within which screen components 221 are arranged. Because there are no restrictions with respect to the layout of basic panel 303 or screen components used therein, one can freely customize the appearance of a screen in a client area.

Additionally, screen class 203 can be regulated independently of logic screen data in screen display processes carried out by a server area. Consequently, screen class 203 can easily be reused in other processes that utilize similar screens.

If, for example, a screen corresponding to "search orders" were prepared, it is likely that the screen would enjoy similarity with such screens as "input new orders" and "amend orders". In this case, it would be possible to reuse the "search orders" screen class 203 for, illustratively, "input new orders" or "amend orders".

Assume that screen class 203 is so reused. Although there might be on the "input new orders" and "amend orders" screens a change button not found on the "search orders", by undertaking at the server-side a process disabling the change button, any disparity associated with the presence or absence of the button can be absorbed.

Logic events (network events) for causing a server area to execute event processing are described in search routines corresponding to designated buttons. By causing a server to perform a call-back roughly contemporaneously with the demand for event processing, it is possible with out restriction to cause the server to carry out the desired process in a client area. It is thus possible through this function to perform tuning for optimal forwarding with due consideration for network loads.

<Screen Item Restrictions Settings Class 211 (Client Area)>

Screen item restrictions settings class 211 is installed in a client area and corresponds to a designated screen class 203. Screen item restrictions settings class 211 defines restrictions for screen components 221 in screens corresponding to screen class 203.

A limitation of the "employees" component, for example, to a value of 6 rows is illustrative of the restriction items described in this class.

As each screen class 203 is executed, view controller 216 (client library 216) simultaneously reads a screen item restrictions settings class 211 corresponding thereto. Each screen item restriction in a screen item restrictions settings class 211 is thus made operative with respect to each corresponding screen component 221.

<State Transition Table Generation Class 208 (Server Area)>

State transition table generation class 208 is a class for generating a state transition table in a server area.

This state transition table generation class 208 is read by server library 217 and managed by state transition management module 219, which constitutes server library 217.

It is unnecessary to describe state transition table generation class 208 directly, because it can be generated automatically from state transition definition table 204, which is described by a user and hereinafter explained.

<Event Process Class 207 (Server Area)

Logic events occurring in a client area screen are communicated as network events to state transition management module 219 in a server area, and specific methods for event process class 207 corresponding to the network events are executed. Each method is described by an application developer as a process corresponding to a specific condition for a specific logic event (network event). More specifically, each method can be described, illustratively, in terms of the following processes.

A process that, through database operating interface 213, calls up database operating module 214 and carries out searches or changes with respect to database 215.

A process that performs specific operations with respect to logic screen data transferred as network events and returns the results of those operations.

A process that controls state transition destination based on incidence of changes in or exceptions to states.

It is possible to describe in event processing class 207 code for handling exceptions. Exceptions are processed, by way of illustration, according to the following representative examples.

1. A tri-catch block, one descriptive method for processing exceptions regulated by programming language, is created in each location where the occurrence of exceptions is likely, and that program receives the exception. A return code to be used upon the happening of an exception is described in this tri-catch block.

2. A specific method (exception listener) for receiving an exception as an exception event is described (see FIG. 5 (510), hereinafter explained). An event not handled according to the preceding representative example 1 is converted into an exception event, and the exception listener is so notified. An exception listener can be described for each state transition.

3. Where there exists in a state transition a parent/child relationship, an exception that is neither returned according to the child transition state, nor described in an exception listener, is automatically converted to the parent exception transition state, and an exception listener in the parent state transition is so notified. Where there is no exception listener corresponding to the exception event described in the parent transition state, the exception event is traced back to the parent state transition. If, ultimately, the parent of the highest order (that is, the initial state transition when operation is commenced in a client area) does not receive this exception event, an application error occurs.

<Event Process Interface 209 (Server Section)

As described above, a method for processing events occurring in each state must be described in event process class 207. Interfaces (declaration area) for these methods are described in event process interface 209, which is executed in a server area.

This event process interface 209 is automatically generated from state transition definition table 204, which is described by a user and hereinafter explained. It is thus possible to maintain coordination between state transition table 204 and event process class 207 to protect against the contingency of modifications to state transition table 204.

<Database Item Equivalency Class 210 (Server Area)

As noted above, event process class 207 performs processing primarily by joining database items on database 215 with screen items on logic screens. Database item equivalency class 210, which is installed in a server area, is a class automatically generated from database item equivalency table 206 to join automatically database items with screen items. Described by a user, database item equivalency table 206 is hereinafter explained.

There are instances in which screen items and definitions do not match database items and definitions. Accordingly, a user may describe in event process class 207 a code for establishing correlation.

<Database Operating Interface 213, Database Operating Module 214 (Server Area or the like)>

Any database management library may be used as an interface and module executed in a server area or dedicated server area. For example, a library supplied with a structured query language (SQL) may be adopted.

<Logic Screen Data>

Figure 4:
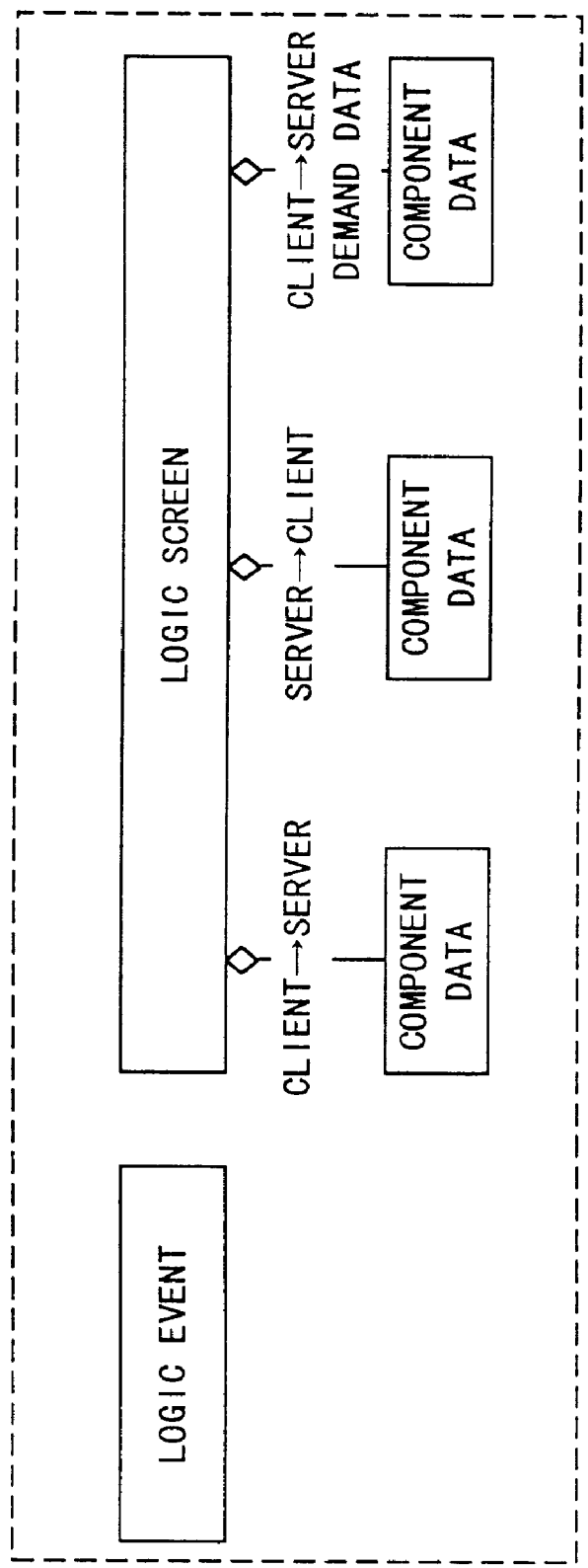
FIG. 4 describes the network data exchanged electronically between client and servers in the preferred embodiment of the present invention.

Logic screen data are information communicated as network data 220 between client and server areas and, as FIG. 4 discloses, comprise the following data.

Component data transmitted from a client area to a server area.

Component data transmitted from a server area to a client area.

Demand data transmitted from a client area to a server area.

"Component data", as used herein, refers to display and restriction content for controlling screen components 221.

Established in event process class 207, "demand data transmitted from a client area to a server area" indicate the types of information that ought to be sent from a client area, when a logic event occurs in that client area and the event summons an event process class 207 in a server area. By utilizing this demand data, it is possible collectively to manage at the server area all logic screen data.

<Detailed Operation of the Preferred Embodiment of the Present Invention>

Figure 5:
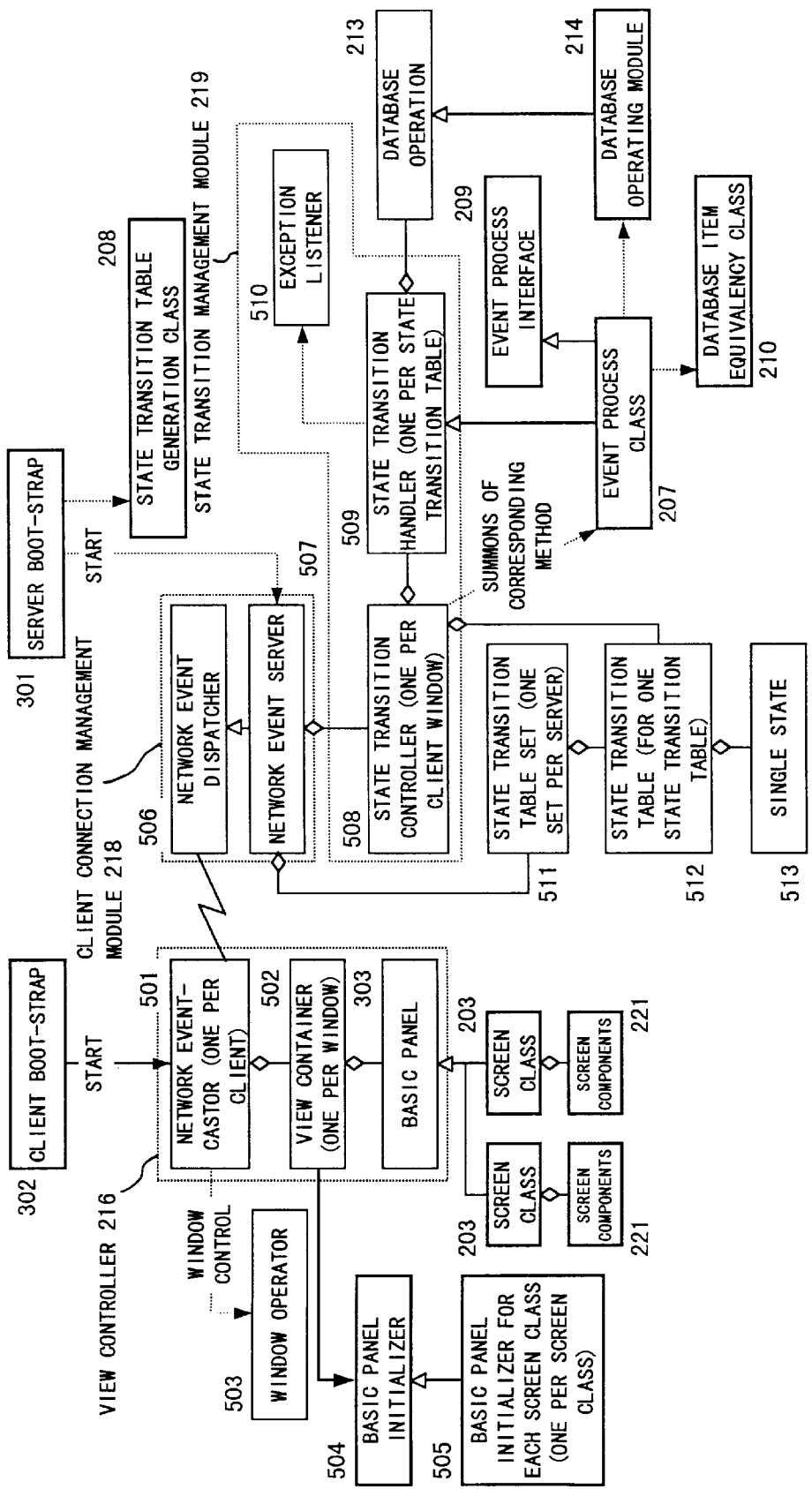
FIG. 5 presents a detailed operating program block diagram for the preferred embodiment of the present invention.

FIG. 5 is a detailed operating block diagram for the preferred embodiment of the present invention, based on the configuration disclosed in FIG. 2 and FIG. 3. Portions of FIG. 5 to which are assigned numbers common to FIG. 2 and FIG. 3 comprise the same functions as those disclosed therein.

View controller 216, which is started from client bootstrap 302 (corresponding to client main program 302 in FIG. 3) in the client area, comprises network event-caster 501, view container 502, and basic panel 303.

A network event-caster 501 is started with respect to one client area. Network event-caster 501 transmits, as network events, logic events transferred from view container 502 and, conversely, receives logic screen data from a server area and transfers that data to view container 502. Network event-caster 501 also executes window control for demanding window operations with respect to window operator 503, which is dependent upon and started by a client area platform (an operating system).

One view container 502 is started corresponding to one window. First, view container 502 initializes basic panel 303 screen display corresponding to each screen class 203, by starting via an interface of basic panel initializer 504, which is described for each screen class 203. View container 502 converts component data received as logic data from network event-caster 501 into screen component 221 data for screen class 203, which belongs to basic panel 303, and controls screen display. Conversely, view container 502 converts events occurring in each screen class 203 into logic events and transfers the logic events to network event-caster 501.

Next, state transition table generation class 208, which is started from server boot-strap 301 (corresponding to server main program 301 in FIG. 3), is automatically generated from state transition definition table 204 in a server area. State transition definition table 204 is hereinafter explained. The state transition generation class 208 corresponds to one state transition definition table 204. Additionally, state transition generation class 208 manages state transition table 512, which is described as a collection of each condition 513, and state transition table set 511, which is a collection of state transition tables 512.

Started from server boot strap 301, client connection management module 218 comprises network event dispatcher 506 and network event server 506.

Network event dispatcher 506 receives from each client area network events, which are logic events, and transfers the events to network event server 507. Conversely, network event dispatcher 506 receives logic screen data back from network event server 507 and transmits the data to each client area.

For each state transition table 512 (state transition definition table 204), which is managed by state transition table generation class 208, network event server 507 starts an exception listener 510 and a state transition handler 509, which comprises a state transition management module 219, and, for each client area window, it starts a state transition controller 508, which comprises state transition management module 219. Additionally, network event server 507 transfers to state transition controller 508 network events received from each client area via network event dispatcher 506, conversely, and transmits to each client area, via network event dispatcher 506, logic screen data received from state transition controller 508.

As described above, state transition management module 219 comprises state transition handler 509, exception listener 510, and state transition controller 508.

One state transition controller 508 is started for each window generated in a client area. State transition controller 508 converts network events transferred from network event server 507 into a corresponding event process class 207 method and issues that method, via state transition handler 509, to event process class 207. State transition controller 508 receives, via state transition handler 509, event processing results from event process class 207 and, as required, controls state transition in state transition table 512, based on the event processing results. Furthermore, state transition controller 508 transfers to network event server 507 logic screen data that either state transition controller 508 or, alternatively, event process class 207, has generated for transmission to each client area.

One state transition handler 509 is started for each state transition table 512 (state transition definition table 204). State transition handler 509 issues a method transferred from state transition controller 508 to a corresponding event process class 207. Conversely, state transition handler 509 transfers processing results output by event process class 207 to state transition controller 508. State transition handler 509 also transfers to data base operating module 214, via database operating interface 213, database operating commands output by event process class 207. Conversely, state transition handler 509 transfers to event process class 207 database operating results output from database operating module 214 through database operating interface 213.

Exception listener 510 is started with respect to state transition handler 509 and monitors the occurrence of exception events during processing in event process class 207. In the event of an exception, exception listener 510 starts an appropriate exception processing routine (such as the above-described "tri-catch block" or the like).

Figure 6:
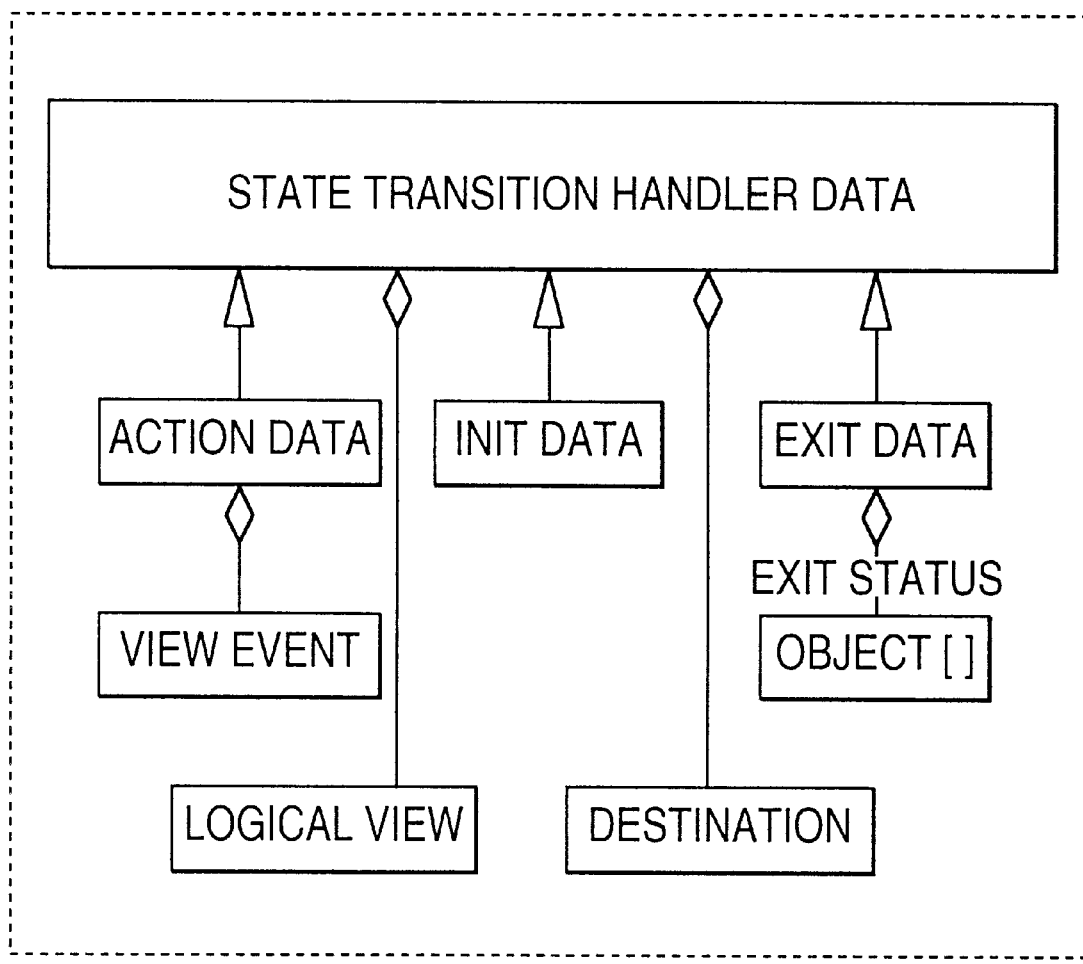
FIG. 6 describes state transition handler data.

FIG. 6 discloses types of state transition handler data (method and event processing results data) that are communicated by state transition handler 509 between state transition controller 508 and event process class 207.

"InitData" are data required by state transition controller 508 to initialize event process class 207 state.

"ViewEvent" are logic events (network events) issued from client areas to server areas.

"ActionData" are data for which are specified each process type issued from state transition controller 508 to event process class 207, based on "ViewEvent."

"LogicalView" are logic screen data, which are event processing results transferred from event process class 207 to state transition controller 508.

"Destination" are data indicating state transition destinations, which are event processing results transferred from event process class 207 to state transition controller 508.

"ExitData" are event processing results data transferred from event process class 207 to state transition controller 508 at the conclusion of the execution of an event process class 207. These data are of "object [ ]" form, and their value is expressed as "exitStatus."

Figure 7:
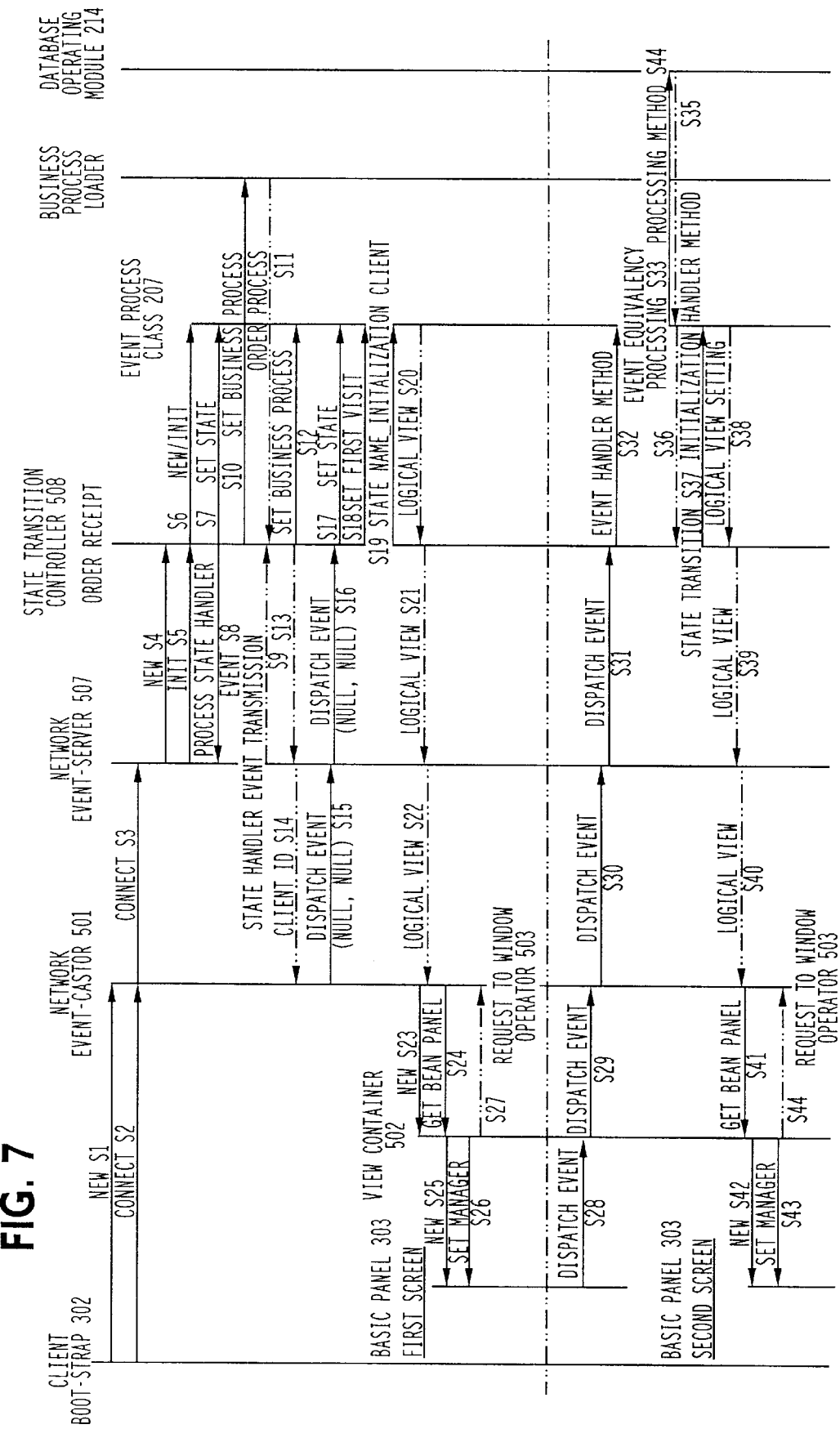
FIG. 7 discloses the detailed operating sequence for the preferred embodiment of the present invention (1 of 2).

FIG. 7 discloses a detailed operating sequence diagram for the preferred embodiment of the present invention (1 of 2) and further discloses an operating sequence typical where a client area initially undertakes connection to a server area.

FIG. 7 is explained below with reference to FIG. 5. In this explanation, S1–S44 are identification symbols for each sequence represented in FIG. 7.

FIG. 7 presupposes that network event dispatcher 506, network event server 507, and state transition table generation class 208 have already been started by server boot-strap 301.

First, client boot-strap 302 starts network event-caster 501 (S1) by executing constructor "new".

Next, client boot-strap 302 issues a "connect" method to network event-caster 501 (S2). Network event-caster 501 transmits that "connect" method, as network data 202, to a server area. After being received at network event dispatcher 506 in a server area, the "connect" method is transferred to network event server 507 (S3)

When network event server 507 receives the "connect" method, it starts a state transition controller 508 (parent) for, illustratively, an order receipt process, by executing constructor "new" (S4). Network event server 407 then issues to state transition controller 508 an "init" method for initializing the condition (S5).

When state transition controller 508 receives the above "init" method from network event server 507, it starts an event processing class 207 (parent) for, illustratively, an order receipt process, by executing a constructor "new". State transition controller 508 issues to that event process class 207 an "init" method (S6) and, additionally, issues a "setState" method for establishing the initial state, which is the current state (S7).

Next, state transition controller 508 issues to network event server 507 a "processStateHandlerEvent" method, which is the transmission demand for starting a state transition (S8). Receiving this, network event server 507 dispatches to state transition controller 508 the state transition start event "StateHandlerEvent" (S9).

At the conclusion of this event process, state transition controller 508 issues to a business process loader (not shown in FIG. 5) a "getBusinessProcess" method for, illustratively, acquiring database operating module 214 for order processing (S10). Consequently, "OrderProcess" information data relating to the requested database operating module 214 are returned from the business process loader to state transition controller 508 (S11). When condition scroll controller 508 receives this information data, it issues to event process class 207 a "setBusinessProcess" method for establishing information data relating to the database operating module 214. As a result, information relating to database operating module 214 is established in event process class 207.

At the conclusion of this operation, an initial set-up completion is returned from state transition controller 508 to network event server 507 (S13), and a client ID for identifying connections with client and server areas is returned as network data 220, via network event dispatcher 506, from network event server 507 to the network event-caster 501 within the client area (S14).

When a client ID is thus returned from the server area to network event-caster 501 in the client area, network event-caster 501 issues to the server section the event "dispatchEvent (null, null)", with respect to which null value has been established as "null" for both the event name (first argument) and logic screen data (second argument) (S15). When a network event server 507 in a the server area receives, via network event dispatcher 506, the above-described event, it transfers that event to the corresponding state transition controller 508 (S16).

When state transition controller 508 receives the above-described event, it issues to the corresponding event process class 207 a "setstate" method for establishing the initial state, which is the present state (S17). State transition controller 508 then issues a "setFirstVisit" method indicating that the particular state is the first state to appear (S18) and, further, issues a "state name_initialization" method directing an initialization process with respect to the present state name (S19).

Consequently, event process class 207 generates logic screen data "LogicalView" for displaying the initial screen and transfers that data to state transition controller 508 (S20). State transition controller 508 transmits the logic screen data as network data 220, via both network event server 507 and network event dispatcher 506, to a client area network event-caster 501 (S21, S22).

When network event-caster 501 receives the logic screen data "logicalview" data for displaying the above-described initial screen, it starts view container 502 by executing constructor "new" (S23).

Network event-caster 501 issues to view container 502 a "getBeanPanel" method for directing the start-up of basic panel 303 of screen class 203 for displaying an initial screen corresponding to the above-described logic screen data (S24).

As a result, view container 502 starts the basic panel 303 for the first screen in screen class 203, by executing constructor "new" (S25). View container 502 then issues to basic panel 303 a "setManager" method that establishes information for identifying view container 502 (S26). Consequently, the basic panel 303 and the above-described view container 502 are connected. View container 502 then issues a display request for the above-described first initial screen to window operator 503 (S27), which is started in reliance upon a platform (operating system).

When some type of event thereafter occurs in the initial screen first screen based, illustratively, on manipulation by a user, basic panel 303 for the first screen in screen class 203 issues event "dispatchEvent" to view container 502 (S28). This event is transmitted, via view container 502 and network event-caster 501, to a server area (S29, S30), and notification of the event is made, via both network event dispatcher 506 and network event server 507 both in the server area, to the corresponding state transition controller 508 (S31).

When state transition controller 508 receives the event "dispatchEvent", it generates an event process class 207 method (event handler method) corresponding to the event (S32) and issues the method to the corresponding event process class 207.

When event process class 207 receives, via state transition handler 509, the event handler method from state transition controller 508, it executes a process corresponding to the event (S33). If required at this time, event process class 207 issues to database operating module 214 a method (process method) directing the operation of database 215 (S34), and obtains the result of the operation from database operating module 214 (S35). Event process class 207 notifies state transition controller 508 of the event processing result (S36).

When state transition controller 508 receives the event result from event process class 207, it initiates, as required, a state transition in state transition table 512, which is managed by state transition table generation class 208, and thereafter issues an initialization handler method for carrying out display of the next screen (S37).

Upon receipt of this method, event process class 207 generates logic screen data "LogicalView" for displaying a second screen and transfers the method to state transition controller 508 (S38). State transition controller 508 transmits the logic screen data, as network data 220, to network event-caster 501 in a client area, via both network event server 507 and network event dispatcher 506 (S39, S40).

When network event-caster 501 receives the logic screen data "LogicalView" for displaying the second screen, it issues to view container 502 a "getBeamPanel" method for directing the start-up of a basic panel 303 of a screen class 203 for displaying a screen that corresponds to the logic screen data (S41).

As a result, view container 502 starts basic panel 303 of screen class 203 for a second screen, by executing constructor "new" (S42). View container 502 issues to the basic panel 303 a "setManager" method that establishes information for identifying the view container 502 (S43). Consequently, the basic panel 303 and the view container 502 are connected one with the other. View container 502 then issues to window operator 503 a display demand for the second screen (S44).

Figure 8:
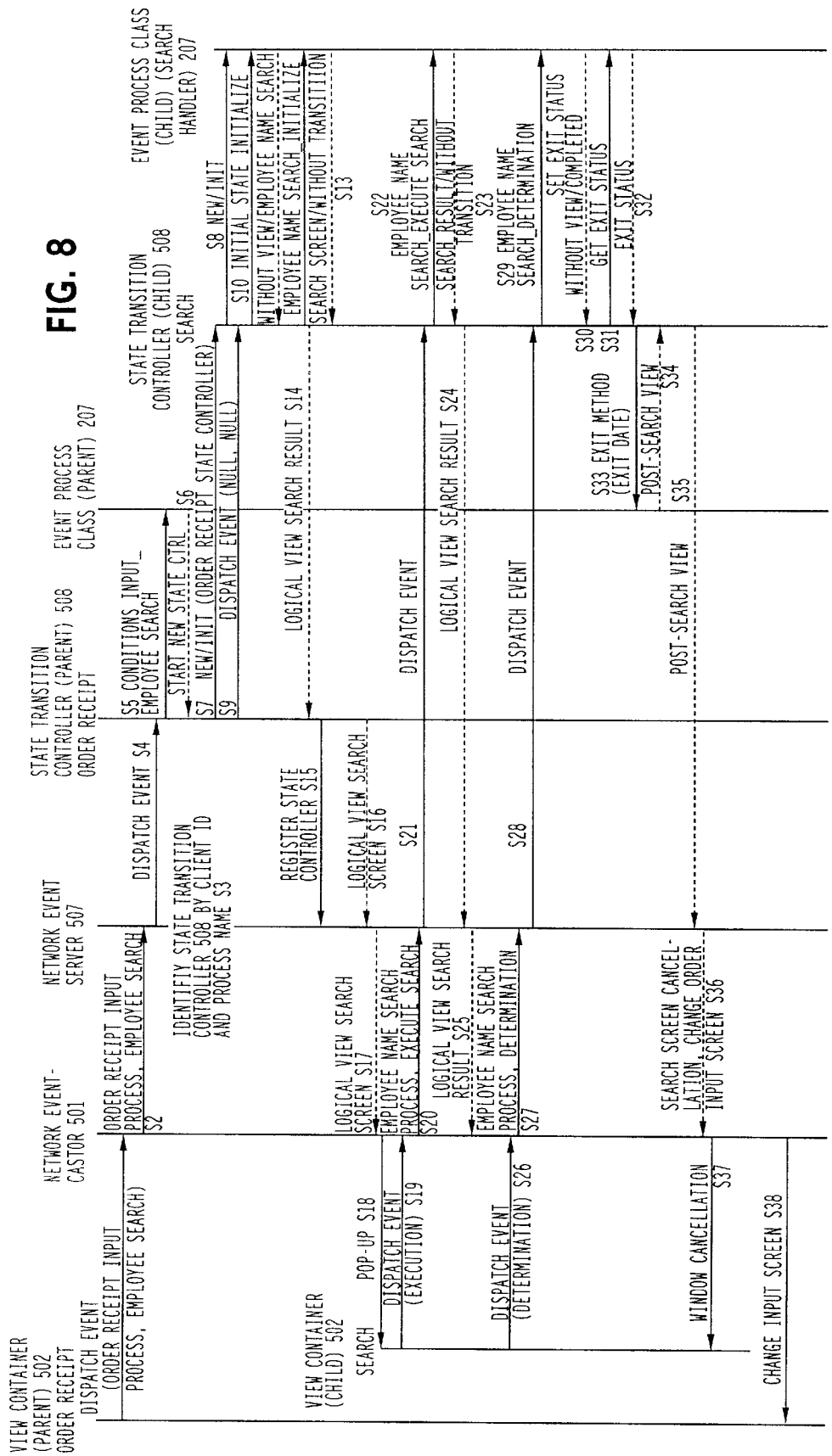
FIG. 8 discloses the detailed operating sequence for the preferred embodiment of the present invention (2 of 2).

FIG. 8 is a detailed operating sequence diagram for the preferred embodiment of the present invention (2 of 2). FIG. 8 discloses an illustrative operating sequence for displaying in a client area an employee search screen in the order input process. FIG. 8 is explained below with reference to FIG. 5. S1 through S38 in the following explanation correspond respectively to each sequence identification mark shown in FIG. 8.

For purposes of this explanation, it is presumed: that the connection between server area and client area is already complete by the working sequence described in FIG. 7; that network event-caster 501 and view container 502 for order processing have already been started in a client area; and that state transition controller 508 (parent) for order processing and event process class 207 (parent) have already been started in a server area.

First, an event "dipatchEvent (order input processing, employee search)" for directing an employee search in the order process is issued, in the client area, from view container 502 (parent) to network event-caster 501 (S1). Network event-caster 501 transmits the event to the server area (S2).

When network event server 507 in the server area receives the event via network event dispatcher 506, it identifies a state transition controller 508 (parent) for order input processing based on the client ID attached to the event and the process name (S3) and issues event "dispatchEvent" to the state transition controller 508 (S4).

As a result, state transition controller 508 (parent) issues to a corresponding event process class 207 (parent) a "conditions input_employee search" method corresponding to the event (S5). Upon receipt of this method, event process class 207 (parent) returns to state transition controller 508 (parent) event processing result "startNewStateCtrl", which directs a new state transition (S6).

Receiving this result, state transition controller 508 starts a state transition controller 508 (child) for search processing by executing constructor "new" and issues an "init" method to the state transition controller 508 (child) (S7).

When the state transition controller 508 (child) receives the "init" method from state transition controller 508 (parent), it starts event process class 207 (child), a search handler, by executing constructor "new", and issues an "init" method to the event process class 207 (child) (S8).

Next, state transition controller 508 (parent) issues to state transition controller 508 (child) an event "dispatchEvent (null, null)" corresponding to events that have been received from network event server 507 (S9). State transition controller 508 (child) issues to event process class 207 (child) an "initial state initialization" method that directs an initialization process corresponding to the present initial state (S10). An event processing result directing the shift to employee name search state (without view (screen transition)) is returned from event process class 207 (child) to state transition controller 508 (child) (S11).

When state transition controller 508 (child) receives the event processing result from event process class 207 (child), it issues a method "employee name search_initialization" that directs initialization with respect to a new state "employee name search" (S12).

As a result, event process class 207 generates logic screen data "LogicalView" for displaying a search screen and transfers the data (without initiating a state transition), via state transition controller 508 (child), to state transition controller 508 (parent) (S13, S14).

State transition controller 508 (parent) issues to network event server 507 a "registerStateController" method for directing connection to a state transition controller 508 (child) (S15). Network event server 507 and state transition controller 508 (child) are thus connected.

State transition controller 508 (parent) transfers to network event server 507 logic screen data "LogicalView", received from state transition controller 508 (child), for displaying a search screen (S16). Network event server 507 transmits the logic screen data to a client area via network event dispatcher 506 (S17).

Upon receipt of the logic screen data, network event-caster (501) in the client area starts view container 502 (child) for displaying a search screen and directs view container 502 (child) to undertake pop-up display of a search screen (S18).

If a user thereafter directs execution of an employee name search on a search screen, an event "dispatchEvent (execute)" directing execution of a search is initiated from view container 502 (child) with respect to network event-caster 501 (S19).

This event is transmitted from network eventcaster 501 to a server area and, after being received in the server area at network event server 507 (S20) via network event dispatcher 506, is transferred to state transition controller 508 (child) corresponding to the search process (S21).

State transition controller 508 (child) converts the event directing the search execution to a method "employee search execute search" corresponding thereto and issues that method to a corresponding event process class 207 (child) (S22).

Although not specifically depicted by drawing, event process class 207 (child) issues a search command to database operating module 214 and executes search processing with respect to database 215. After obtaining a search result, event processing class 207 (child) returns the search result (without initiating a state transition) to state transition controller 508 (child) (S23).

State transition controller 508 (child) generates logic screen data "LogicalView" for displaying a search result and transmits that logic screen data as network data 220, via both network event server 507 and network event dispatcher 506, to a client area network event-caster 501 (S24, S25).

If a user directs on a search screen finalization of an employee name search, an event "dispatchEvent (finalize)" is issued from view container 502 (child) to network event-caster 501 (S26).

This event is transmitted from network event-caster 501 to a server area and, after being received at network event server 507, via network event dispatcher 506 (S27), transferred to state transition controller 508 (child), which corresponds to a search process (S28).

State transition controller 508 (child) converts the event directing search finalization to a method "employee search finalize" corresponding thereto and issues the method to the corresponding event process class 207 (S29). Further to the method, state transition controller 508 (child) transfers to event process class 207 (child) a "setExitStatus" method that directs the establishment of a completed return value.

As a result, event process class 207 (child) executes completion processing for the search process and returns to state transition controller 508 (child) an event process result (without view (screen transition)) indicating completion (S30). State transition controller 508 (child) issues to event processing class 207 (child) a "getExitStatus" method for demanding a completion return value (S31). Accordingly, a completion return value "exitStatus" is returned from event process class 207 (child) to state transition controller 508 (child) (S32).

State transition controller 508 (child) issues to event process class 207 (parent) a "exitMethod (ExitData)" method for directing the execution of process completion (S33). In consequence thereof, logic screen data for displaying a post-search completion screen are returned from event process class 207 (parent) to state transition controller 508 (parent) (S34). This logic screen data comprise data for cancelling the present search screen and modifying an order input screen.

State transition controller 508 (child) transmits the logic screen data, as network data 220, to network event-caster 501 in a client area, via both network server 507 and network event dispatcher 506 (S35, S36).

Network event dispatcher 501 issues to view container 502 (child) a method directing cancellation of the present window based on the logic screen data (S37) and, with respect to view container 502 (parent), issues a method directing an input screen modification (S38).

<Types of Specification Sheets and Automatic Generation of Classes Corresponding Thereto>

The following specification sheets are used in the framework 201 according to the preferred embodiment of the present invention to improve the efficiency of software development and maintenance.

State Transition Definition Table 204: Defining the ways in which a plurality of screens are to transition, state transition definition table 204 is described, illustratively, in a data format disclosed in FIG. 9. Skeletons for state transition table generation class 208, event processing interface 209, and event processing class 207 are generated automatically from this table.

Screen Item Restrictions Table 205: Defining screen item restrictions, screen item restrictions table 205 is described, illustratively, in a data format disclosed in FIG. 10. Screen item restrictions settings class 211 is generated automatically from this table.

Database Item Equivalency Table 206: Defining corresponding relationships among screen items and database items, database item equivalency table 206 is described, illustratively, in a data format disclosed in FIG. 11. Database item equivalency class 210 is generated automatically from this table.

When screen class 203 is defined, it is possible to constitute the class so that a listing of items included therein is established automatically in screen item restrictions table 205 and database item equivalency table 206. Accordingly, a developer can perfect respective tables by simply describing, by way of example, that portion of FIG. 10 or, alternatively, FIG. 11, contained within the broken lines. Furthermore, when the numbers of rows for each screen item are defined collectively within screen class 203, a developer need describe the number of rows with respect to only those screen items for which a number of rows has not yet been defined.

Each of the classes is generated automatically from tables disclosed in FIGS. 9 through 11. Specifically, in the preferred embodiment of the present invention, specifications are described in specifications sheets easily comprehensible by human beings, and, because the specifications are converted into program, software development and maintenance are commensurately simplified.

In screen item restrictions list 205, it is possible to describe a plurality of conditions for a single restriction. Identification tags are established respectively for the conditions, and, by setting the identification tags in the server area, it is possible automatically to switch conditions with respect to screens. As shown in FIG. 10, for example, it is possible to allocate respectively a Japanese name and english name to items called display name 1 and display name 2, thereby establishing in a server section which display names are to be used. This enables the system to respond to multiple languages.

<Development Procedure>

Figure 12:
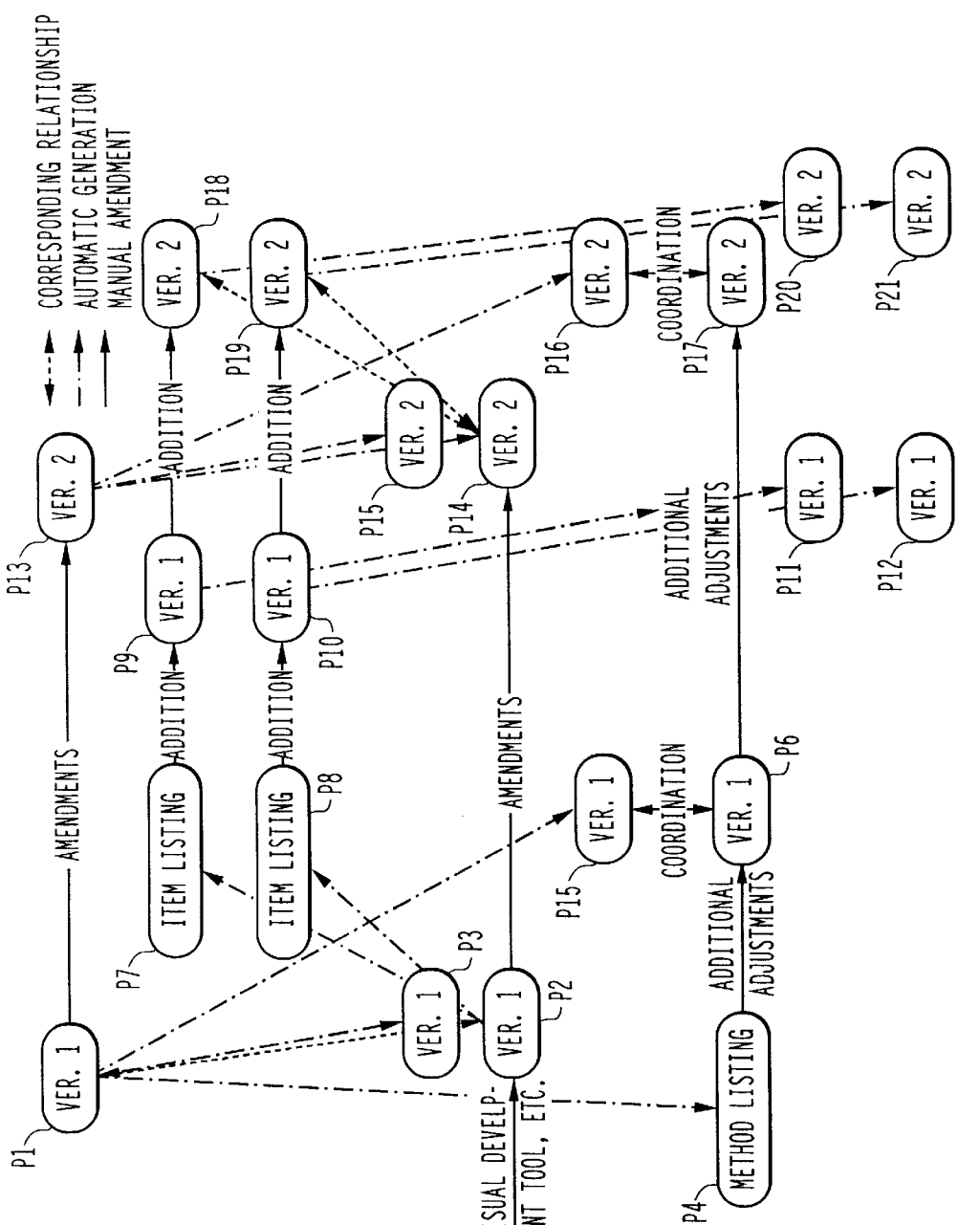
FIG. 12 describes the order of development in the preferred embodiment of the present invention.

An illustrative development procedure utilizing framework 201 in the preferred embodiment of the present invention is disclosed in FIG. 12.

First, in addition to generating a version 1 (ver. 1) for state transition definition table 204 (P1) by, illustratively, a data format shown in FIG. 9, a developer prepares a version 1 for screen class 203 utilizing, illustratively, a visual development tool (P2). In this case, it is assumed that the screen name established in state transition definition table 204 corresponds to the screen name for the prepared screen class 203.

A version 1 for state transition table generation class 208 is generated automatically from version 1 for state transition definition table 204 (P3).

A skeleton for event process class 207 is generated automatically from state transition definition table 204 (P4), and a version 1 for event process interface 209 is generated automatically (P5). A developer makes additional adjustments to the event process class 207 skeleton and completes version 1 for event process class 207, so as to coordinate it with event process interface 209 (P6).

An item listing is established automatically with respect to both screen item restrictions table 205 and database item equivalency table 206, based on version 1 for screen class 203 (P7, P8). A developer adds in a data format the descriptions bounded by the broken lines in both FIG. 10 and FIG. 11 to the screen item restrictions table 205 and database item equivalency table 206, respectively, thus perfecting respective versions 1 (P9, P10).

A version 1 for each of screen item restrictions establishment class 211 and database item equivalency class 210 are generated automatically from screen item restrictions table 205 and database item equivalency table 206, thus completed (P11, P12).

Next, it is assumed that a developer upgrades to a version 2 the contents of each of state transition definition table 204 and screen class 203.

As a result, a version 2 for state transition table generation class 208 is generated automatically from version 2 of state transition definition table 204 (P15).

Also, a version 2 for event process interface 209 is generated automatically from version 2 of state transition definition table 204 (P16). A developer amends version 1 of event process class 207 and upgrades the version 1 to version 2, so as to coordinate event process class 207 with event process interface 209 (P17).

On the other hand, an item listing is added to both screen item restrictions table 205 and database item equivalency table 206, based on version 2 of screen class 203. A developer adds descriptions for the added items to both screen item restrictions table 205 and database item equivalency table 206, respectively and thus perfects the respective versions 2 (P18, P19).

Versions 2 for each of screen item restrictions settings class 211 and database item equivalency class 210 are generated automatically from the screen item restrictions table 205 so perfected (P20, P21).

Efficient system development becomes possible by proceeding as described above.

<Illustrative Application of the Preferred Embodiment of the Present Invention>

Figure 13:
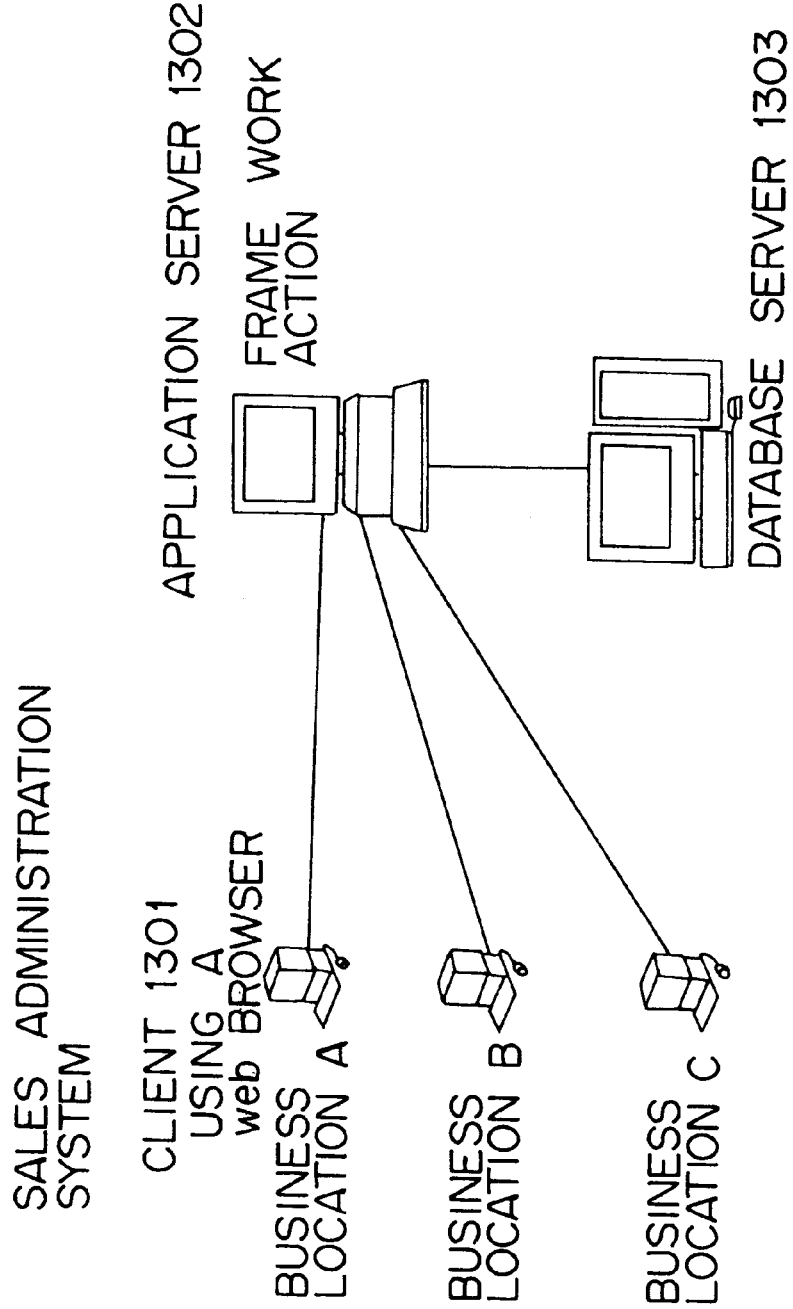
FIG. 13 discloses an illustrative application of the preferred embodiment of the present invention.

FIG. 13 discloses an illustrative application of the preferred embodiment of the present invention.

This illustrative application is based on a three-tier sales management (administration) system comprising client 1301, application server 1302, and database server 1303.

In this case, framework 201 (FIG. 2) according to the preferred embodiment of the present invention is situated on application server 1302. Programs (view controller 216 in FIG. 2) executed by client 1301 are downloaded at any time, illustratively, as an applet of a web browser.

What is claimed is:

1. An apparatus for constructing and operating interactive software utilizing physical screens, based on specification definitions said apparatus comprising:
    a state transition definition table to describe state transition definitions relating to screen names;
    a state transition table generation class generated automatically from the state transition definition table;
    a state transition management module to control a state transition of screens with reference to a state transition table generated from the state transition table generation class and according to input of events derived from the screens, and to control display of the screens based on the state transition thereof and logic screen data, including demand data that regulate events derived from the screens, at least one of the state transition management module and an event process class collectively managing information relating to the screens; and
    a view control module to convert the logic screen data into physical screen data and to control at least one of display on the physical screens and input utilizing the physical screen data.

2. The apparatus according to claim 8,
    wherein said state transition definition table provides descriptions for state names, an event name for each of the state names, and an action name for each event name,
    wherein each event process class executes an event process corresponding to an action defined in said state transition definition table, and
    wherein said state transition management module, upon occurrence of an event, acquires by reference to said state transition table both a present state name corresponding to a present state and the action name corresponding to the event name that matches the event, starts the event process class corresponding to the action name, and controls the state transition based on an execution result according to the event process class.

3. The apparatus according to claim 2, further comprising an event interface, generated automatically from said state transition definition table to maintain an interface for the event process class.

4. The apparatus according to claim 2, further comprising:
    a business object item equivalency table describing corresponding relationships of each item in a screen and each item among business objects;
    a business object item equivalency class generated automatically from said business object item equivalency table, and
    wherein the event process class, upon the occurrence of an event from a screen, establishes corresponding relationships between each item in the screen causing said event and each item among business objects.

5. The apparatus according to claim 4, wherein a portion of said business object item equivalency table is generated automatically based on definitions relating to the screen.

6. The apparatus according to claim 1, further comprising switching means for electing whether to input the events via a network.

7. An apparatus for constructing and operating interactive software utilizing physical screens, based on specification definition, said apparatus comprising:
    a state transition definition table to describe state transition definitions relating to screen names;
    a state transition table generation class generated automatically from the state transition definition table;
    a state transition management module to control a state transition of screens with reference to a state transition table generated from the state transition table generation class and according to input of events derived from the screens, and to control display of the screens based on the state transition thereof and logic screen data; and
    a view control module to convert the logic screen data into physical screen data, to control at least one of display on the physical screens and input utilizing the physical screen data, to execute, upon derivation of events from the screens, a desired program and to control events transmitted to said state transition management module based on execution of the desired program.

8. An apparatus for constructing and operating interactive software utilizing physical screens, based on specification definitions, said apparatus comprising:
    a state transition definition table to describe state transition definitions relating to screen names;
    a state transition table generation class generated automatically from the state transition definition table;
    a state transition management module to control a state transition of screens with reference to a state transition table generated from the state transition table generation class and according to input of events derived from the screens, and to control display of the screens based on the state transition thereof and logic screen data;
    a screen item restrictions table describing screen item restrictions that control at least one of display with respect to each item in the screens and input with respect thereto; and
    a screen item restrictions settings class generated automatically from said screen item restrictions table; and
    a view control module to convert the logic screen data into physical screen data and to control at least one of display on the physical screens with respect to each item in the screens and input with respect thereto by executing said screen item restrictions settings class.

9. The apparatus according to claim 8, wherein
a portion of the content of the screen item restrictions table is generated automatically based on definitions relating to the screens.

10. The apparatus according to claim 8,
wherein said screen item restriction table describes screen item restriction sets corresponding to at least one of display formats and input formats, and
wherein at least one of display formats and input formats are switched by modifying designations therefor.

11. An apparatus for constructing and operating interactive software based on specification definitions, comprising:
a state transition definition table to describe state transition definitions;
a state transition table generation class generated automatically from said state transition definition table; and
a state transition management module to control a state transition with reference to a state transition table that is generated from the state transition table generation class based on an event input, to process in parallel a plurality of states by preserving state transition parent-child relationships and to notify parent transitions not appearing in an execution stack of exceptions occurring at child transitions, by converting exceptions occurring in each state transition to events and dispatching the events.

12. A computer-readable storage medium storing a program used to direct a computer to perform method of constructing and operating interactive software utilizing physical screens, based on specification definitions, comprising:
describing a state transition definition relating to screen names in a state transition definition table;
generating automatically a state transition table generation class from said state transition definition table;
controlling a state transition of screens with reference to a state transition table generated from the state transition table generation class, based on input of events derived from the screens;
controlling display of the screens based on the state transition thereof and logic screen data, including demand data that regulate events derived from the screens,
collectively managing information relating to the screens;
converting the logic screen data into physical screen data; and
controlling at least one of display on the physical screens and input utilizing the physical screen data.

* * * * *

UNITED STATES PATENT AND TRADEMARK OFFICE
CERTIFICATE OF CORRECTION

PATENT NO. : 6,211,872 B1
DATED : April 3, 2001
INVENTOR(S) : Takahide Matsutsuka, et al.

It is certified that error appears in the above-identified patent and that said Letters Patent is hereby corrected as shown below:

Column 18,
Line 24, change "definition" to -- definitions --.

Column 20,
Line 2, after "program" insert -- a --.

Signed and Sealed this

Sixteenth Day of October, 2001

Attest:

NICHOLAS P. GODICI
Attesting Officer
Acting Director of the United States Patent and Trademark Office